United States Patent
Park et al.

(10) Patent No.: US 11,467,546 B2
(45) Date of Patent: Oct. 11, 2022

(54) SEMICONDUCTOR DEVICE AND PREDICTION METHOD FOR RESOURCE USAGE IN SEMICONDUCTOR DEVICE

(71) Applicant: SAMSUNG ELECTRONICS CO., LTD., Suwon-si (KR)

(72) Inventors: Jong-Lae Park, Anyang-si (KR); Bum Gyu Park, Suwon-si (KR); Young Tae Lee, Seoul (KR); Choong Hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 16/829,557

(22) Filed: Mar. 25, 2020

(65) Prior Publication Data

US 2021/0063973 A1 Mar. 4, 2021

(30) Foreign Application Priority Data

Sep. 4, 2019 (KR) .................... 10-2019-0109588

(51) Int. Cl.
*G05B 13/04* (2006.01)
*G05B 17/02* (2006.01)
(Continued)

(52) U.S. Cl.
CPC ........... *G05B 13/042* (2013.01); *G05B 17/02* (2013.01); *G06F 1/324* (2013.01); *G06F 1/3206* (2013.01);
(Continued)

(58) Field of Classification Search
CPC .... G05B 13/042; G05B 17/02; G05B 13/048; G06F 1/3296; G06F 1/3206; G06F 1/324; H04L 1/203; G06Q 10/06; Y02D 10/00
(Continued)

(56) References Cited

U.S. PATENT DOCUMENTS

| 4,384,354 A | 5/1983 | Crawford et al. |
| 7,356,726 B2 | 4/2008 | Shimoyama et al. |

(Continued)

FOREIGN PATENT DOCUMENTS

| JP | 4024306 B2 | 12/2007 |
| JP | 5887418 B2 | 3/2016 |
| KR | 10-2007-0099181 A | 10/2007 |

OTHER PUBLICATIONS

Yoon et al. (Non-Patented Literature, "Accurate power modeling of modern mobile application processors" (Year: 2017).*

(Continued)

*Primary Examiner* — John E Johansen
(74) *Attorney, Agent, or Firm* — Sughrue Mion, PLLC

(57) ABSTRACT

A semiconductor device is provided. The semiconductor device includes a processing device that provides resource usage information including a utilization value; and a prediction information generating device that generates resource usage prediction information based on the resource usage information and provides the resource usage prediction information to the processing device. The prediction information generating device includes: an error calculator to calculate an error value between the utilization value and a predicted value included in the resource usage prediction information; a margin value calculator to receive the error value from the error calculator and calculate a margin value using the error value; an anchor value calculator to calculate an anchor value using the utilization value; and a predictor to output the predicted value using the anchor value and the margin value. The processing device controls resource allocation of the processing device based on the resource usage prediction information.

20 Claims, 9 Drawing Sheets

(51) Int. Cl.
  *H04L 1/20* (2006.01)
  *G06F 1/3296* (2019.01)
  *G06F 1/3206* (2019.01)
  *G06F 1/324* (2019.01)
  *G06Q 10/06* (2012.01)

(52) U.S. Cl.
  CPC ........... *G06F 1/3296* (2013.01); *G06Q 10/06* (2013.01); *H04L 1/203* (2013.01); *G05B 13/048* (2013.01); *Y02D 10/00* (2018.01)

(58) Field of Classification Search
  USPC .......................................................... 703/14
  See application file for complete search history.

(56) References Cited

U.S. PATENT DOCUMENTS

| | | | |
|---|---|---|---|
| 7,437,580 B2 | 10/2008 | Henderson et al. | |
| 8,447,994 B2 | 5/2013 | Nussbaum et al. | |
| 9,651,969 B2 | 5/2017 | Coutts et al. | |
| 9,760,154 B2 | 9/2017 | Jun et al. | |
| 2015/0058845 A1* | 2/2015 | Song | G06F 9/45533 718/1 |
| 2016/0026507 A1* | 1/2016 | Muckle | G06F 9/5094 718/104 |
| 2016/0320825 A1* | 11/2016 | Panda | G06F 1/3234 |
| 2018/0260243 A1* | 9/2018 | Banerjee | G06F 9/4881 |
| 2018/0321980 A1* | 11/2018 | Lo | G06F 9/4887 |
| 2018/0329859 A1 | 11/2018 | Frans et al. | |

OTHER PUBLICATIONS

Ahmed et al. (Non-Patented Literature, An Energy Efficient Demand-Response Model for High Performance Computing Systems (Year: 2017).*

Chasapis et al. (Non-Patented Literature, "Power Efficient Job Scheduling by Predicting the Impact of Processor Manufacturing Variability") discloses (Year: 2019).*

* cited by examiner

__SEMICONDUCTOR DEVICE AND PREDICTION METHOD FOR RESOURCE USAGE IN SEMICONDUCTOR DEVICE__

CROSS-REFERENCE TO THE RELATED APPLICATION

This application claims priority from Korean Patent Application No. 10-2019-0109588, filed on Sep. 4, 2019 in the Korean Intellectual Property Office, the disclosure of which is incorporated herein by reference in its entirety.

BACKGROUND

1. Field

Apparatuses and methods consistent with example embodiments relate to a semiconductor device, a prediction method for resource usage in the semiconductor device, and controlling resource allocation of the semiconductor device.

2. Related Art

Predictive modeling, such as dynamic voltage and frequency scaling (DVFS), scheduling, or core selection uses a margin value or a margin of error (MoE) to reduce damage. In some cases, a predetermined constant value may be used as a margin value for predictive modeling or a margin of error (MoE).

However, in predictive modeling in which temporal locality exists, a prediction success rate may decrease as a deviation of an actual value increases.

SUMMARY

One or more example embodiments provide a semiconductor device which performs resource usage prediction with improved reliability.

One or more example embodiments provide a prediction method for resource usage in a semiconductor device with improved reliability.

One or more example embodiments provide a prediction method in which the margin value or MoE is variable to reflect a change in actual value, rather than a predetermined constant value.

According to an aspect of an example embodiment, a semiconductor device includes a processing device configured to provide resource usage information including a utilization value; and a prediction information generating device configured to generate resource usage prediction information based on the resource usage information and provide the resource usage prediction information to the processing device. The prediction information generating device includes: an error calculator configured to calculate an error value between the utilization value and a predicted value included in the resource usage prediction information; a margin value calculator configured to receive the error value from the error calculator and calculate a margin value using the error value; an anchor value calculator configured to calculate an anchor value using the utilization value; and a predictor configured to output the predicted value by calculating a prediction constant using the anchor value and the margin value. The processing device is further configured to control resource allocation of the processing device based on the resource usage prediction information.

According to an aspect of an example embodiment, a prediction method for resource usage in a semiconductor device includes receiving, by an error calculator, a utilization value and a predicted value, and calculating an error value between the utilization value and the predicted value, receiving, by a margin value calculator, the error value from the error calculator, and calculating a margin value using the error value, calculating, by an anchor value calculator, an anchor value using the utilization value, calculating, by a predictor, a prediction constant using the anchor value and the margin value and outputting the predicted value; and controlling, by a scheduler, resource allocation of the semiconductor device based on the predicted value.

According to an aspect of an example embodiment, a semiconductor device includes a processing device configured to provide resource usage information including a utilization value; and a prediction information generating device configured to generate resource usage prediction information based on the resource usage information and provide the resource usage prediction information to the processing device. The prediction information generating device includes: an error calculator configured to calculate an error value using the utilization value and a predicted value included in the resource usage prediction information; a margin value calculator connected to the error calculator; an anchor value calculator configured to receive the utilization value; and a predictor connected to the margin value calculator and the anchor value calculator, and configured to output the predicted value. The predicted value varies according to a difference between the utilization value and the predicted value. The processing device is further configured to control resource allocation of the processing device based on the resource usage prediction information.

BRIEF DESCRIPTION OF THE DRAWINGS

The above and other aspects and features will become more apparent by describing in detail example embodiments with reference to the attached drawings, in which.

DETAILED DESCRIPTION

Figure 1:
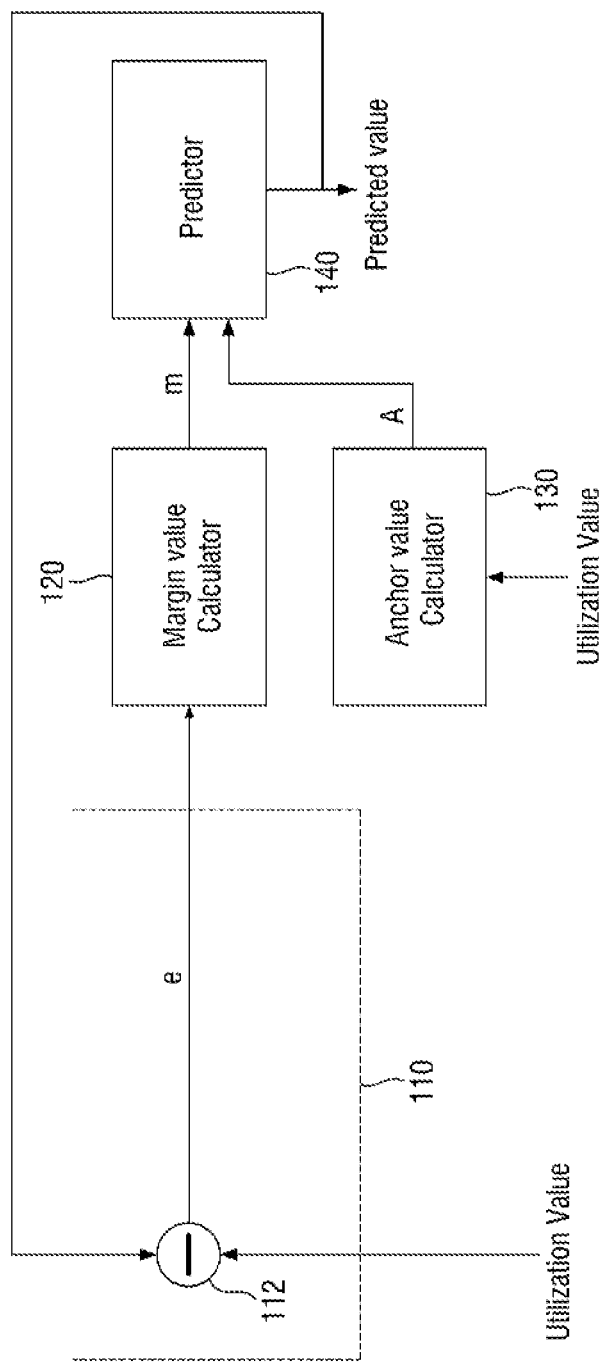
FIG. 1 is a block diagram illustrating a prediction information generating system according to one or more example embodiments.

FIG. 1 is a block diagram illustrating a prediction information generating system according to one or more example embodiments. For example, the predictive information generating system may reflect actual resource use, and may be implemented in a semiconductor device to control resource allocation.

Referring to FIG. 1, a prediction information generating system according to one or more example embodiments includes an error calculator 110, a margin value calculator 120, an anchor value calculator 130, and a predictor 140.

The prediction information generating system according to one or more example embodiments may receive an actual utilization value measured based on resource usage through the error calculator 110. The actual utilization value according to one or more example embodiments may be, for example, the amount accommodated by jobs when selecting a target core in a scheduler.

Further, the error calculator 110 may receive a predicted value outputted through the predictor 140 to be described later. The error calculator 110 may output an error value e obtained based on the received utilization value and predicted value. For example, the error calculator 110 may identify the error value e based on a difference between the received utilization value and predicted value.

In one or more example embodiments, the error calculator 110 may include a subtractor 112. That is, the error calculator 110 may output, as the error value e, a difference obtained by subtracting the predicted value from the utilization value through the subtractor 112 as shown in Eq. 1:

$$e = |\text{Utilization Value}[i] - \text{Predicted Value}[i-1]| \quad \text{Eq. 1}$$

where the predicted value[i−1] is a value obtained by predicting the utilization value of an i time point (e.g., current time point) at an (i−1) time point (e.g., previous time point), and the utilization value[i] may be a value indicating the amount actually used at the i time point (e.g., current time point). Thus, the error value e may be a difference between the previous predicted value and the actual utilization value at the i time point (e.g., current time point).

However, the operation of the error calculator 110 is not limited thereto, and the error calculator 110 may include another modified circuit configuration capable of calculating a difference between the predicted value and the utilization value.

The margin value calculator 120 may receive the error value e outputted from the error calculator 110. That is, the margin value calculator 120 may calculate a margin value m to be used for the calculation of the predicted value calculated by the predictor 140 to be described later.

In one or more example embodiments, the margin value m may not have a fixed value. That is, the margin value m may have a value that changes in real time based on the error value e corresponding to a difference between the predicted value and the utilization value.

In one or more example embodiments, the margin value m may be calculated as shown in Eq. 2 using a Mean Absolute Percentage Error (MAPE) value for the remaining error values except the maximum error value. However, example embodiments are not limited thereto.

$$m = \left\{ \left( \sum_{k=1}^{n} ek \right) - \max(e1, e2, \ldots, e(n-1)) \right\} / (n-1) \quad \text{Eq. 2}$$

The method of calculating the margin value m may not be limited thereto. In one or more example embodiments, Root Mean Squared Error (RMSE), Mean Squared Error (MSE), Mean Error (ME), Mean Percentage Error (MPE), Mean Absolute Error (MAE), Mean Absolute Deviation (MAD), or Mean Absolute Scaled Error (MASE) may be used to calculate the margin value m.

As described above, by using the margin value m which is not fixed, when the actual utilization value has a deviation, the error value e may be reduced compared to the case of using the margin value m which is fixed. In addition, it is possible to prevent unnecessary power consumption that may occur if the margin value m is fixed.

In one or more example embodiments, the predicted value may be calculated based on an anchor value A. In one or more example embodiments, the anchor value A may be calculated via the anchor value calculator 130. The anchor value calculator 130 may receive the actual utilization value measured based on the resource usage.

In one or more example embodiments, a predicted value modeling system is applied to a scheduler, and the anchor value A may be a CPU load calculated with Per Entity Load Tracking (PELT), but example embodiments are not limited thereto.

In one or more example embodiments, the predicted value modeling system is applied to DVFS, and the anchor value A may be a value proportional to the actual utilization value, but example embodiments are not limited thereto.

In the predicted value modeling system according to one or more example embodiments, the anchor value A may be a historic average or a window-based average, a minimum value, or a maximum value provided by the kernel, but example embodiments are not limited thereto.

The anchor value A used to measure the predicted value of the predicted value modeling system according to one or more example embodiments may be used to prevent a decrease in reliability when the predicted value is severely different from the actual utilization value.

The predictor 140 of the predicted value modeling system according to one or more example embodiments may receive the anchor value A from the anchor value calculator 130 and receive the margin value m from the margin value calculator 120, and calculate the predicted value based on the anchor value A and the margin value m.

More specifically, the predictor 140 of the predicted value modeling system according to one or more example embodiments may calculate a prediction constant p by adding the margin value m and the anchor value A as shown in Eq. 3 below.

The anchor value A is to limit the range of the predicted value when the margin value m is excessively large or excessively small, and may be used to reduce the penalty for prediction failure.

$$p = m + A \quad \text{Eq. 3}$$

In one or more example embodiments, the predictor 140 may calculate a prediction constant p by adding the margin value m multiplied by a weight w to the anchor value A as represented in Eq. 4:

$$p = m + w \times A \quad \text{Eq. 4}$$

In one or more example embodiments, the predictor 140 may calculate a predicted value by multiplying the calculated prediction constant p by a maximum value of the utilization value, as represented in Eq. 5:

$$\text{Prediction Value} = \text{Utilization Value(max)} \times p \quad \text{Eq. 5}$$

For example, when the prediction information generating system is applied to frequency selection, the prediction frequency may be Fmax*prediction constant p. Also, for example, when the prediction information generating system is applied to core selection, the core may be selected based on the value of CPUcapacity*prediction constant p.

The predictor 140 may transmit the calculated predicted value to the error calculator 110, more specifically, the subtractor 112.

As described above, the prediction information generating system according to one or more example embodiments may increase prediction accuracy by reflecting a difference between the actual utilization value and the predicted value. In addition, it is possible to reduce unnecessary power consumption due to a situation of using resources unnecessarily.

Figure 2:
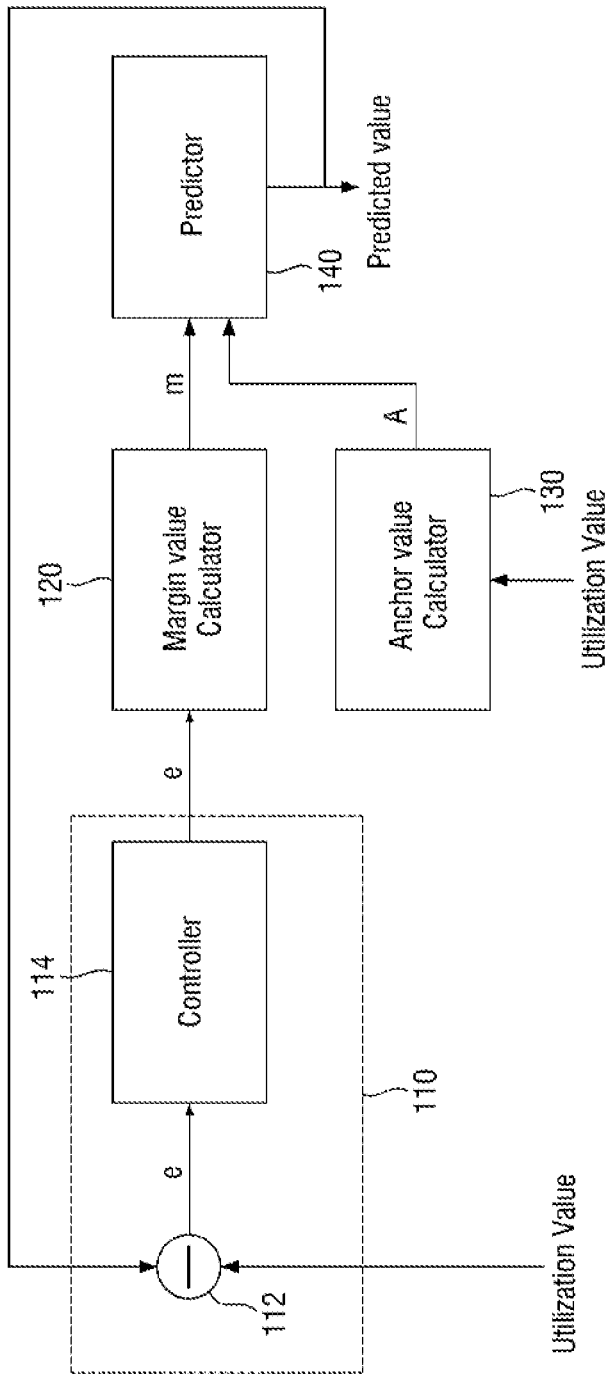
FIG. 2 is another block diagram illustrating a prediction information generation system according to one or more example embodiments.

FIG. 2 is another block diagram illustrating a prediction information generation system according to one or more example embodiments. For reference, the configuration of FIG. 2 is similar to the configuration of FIG. 1, except that a controller 114 is further included in the error calculator 110. Therefore, a description of FIG. 2 will focus on differences from FIG. 1.

Referring to FIG. 2, the error calculator 110 may further include the controller 114 connected to the subtractor 112. The controller 114 may sequentially receive the error values e inputted from the subtractor 112 and output the error values e in the order in which they are inputted. That is, the error values e may be outputted in a first in first out (FIFO) manner through the controller 114 in the error calculator 110. This will be described in more detail with reference to FIG. 3 below.

Figure 3:
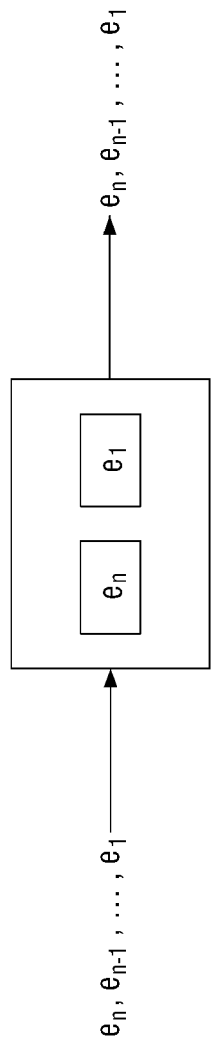
FIG. 3 is a diagram illustrating a controller of the prediction information generating system of FIG. 2 according to one or more example embodiments.

FIG. 3 is a diagram illustrating a controller of the prediction information generating system of FIG. 2 according to one or more example embodiments.

Referring to FIGS. 2 and 3, through the controller 114, a plurality of error values $e_1$ to $e_n$ received from the subtractor 112 may be outputted in the order in which they are inputted. That is, the error values e may be outputted in a first in first out (FIFO) manner through the controller 114 in the error calculator 110.

That is, the controller 114 may store the error values $e_1$ to $e_n$, and first output the error value that is stored (inputted) earliest.

Hereinafter, a case where the error calculator includes a controller will be described, but the configuration of the prediction information generating system and the detailed operation of the method of generating prediction information are not limited thereto.

Figure 4:
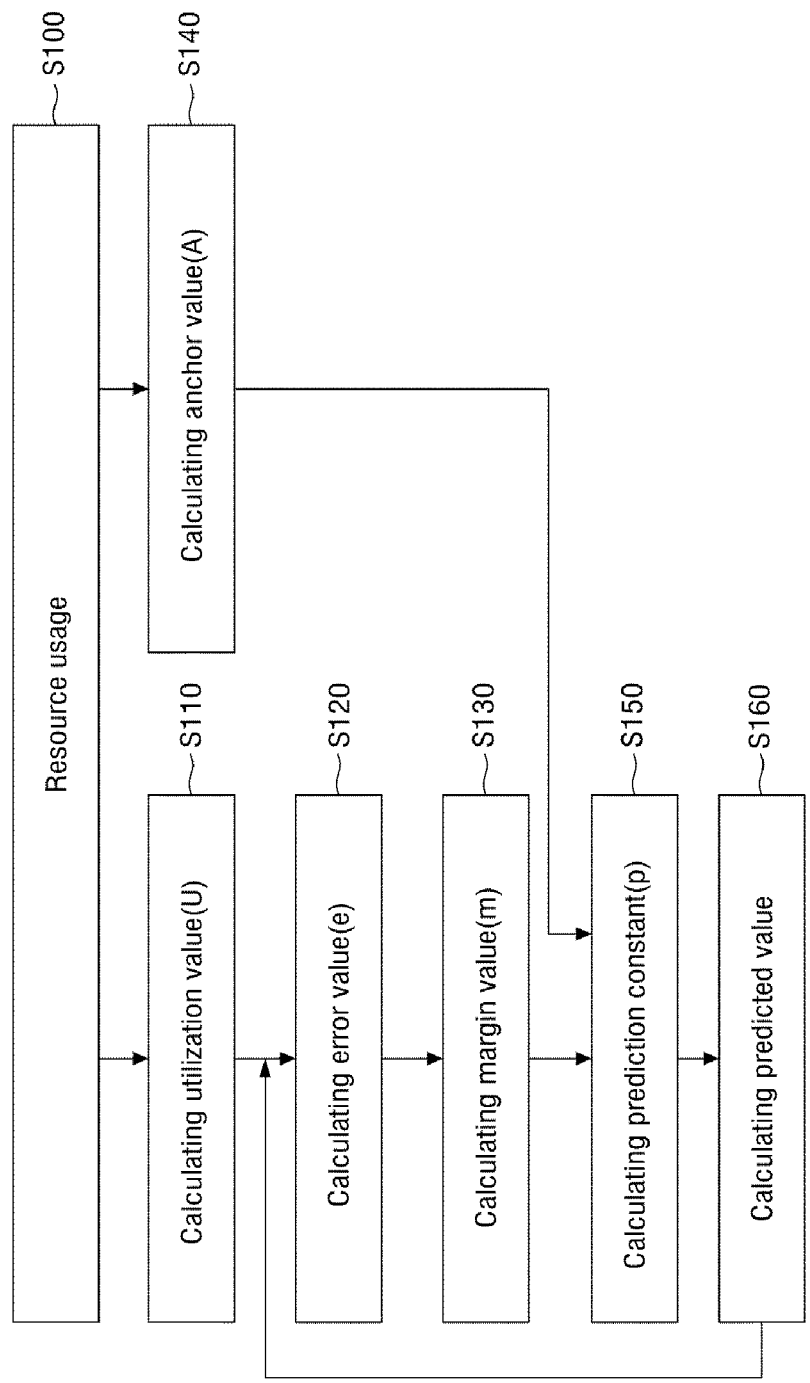
FIG. 4 is a flowchart illustrating a method of generating prediction information, according to one or more example embodiments.

FIG. 4 is a flowchart illustrating a method of generating prediction information, according to one or more example embodiments.

Referring to FIGS. 2 and 4, first, actual resource usage information is obtained (S100).

Subsequently, an actual utilization value may be calculated (S110). For example, the error calculator 110 described above may calculate an utilization value measured on the basis of resource usage. In addition, the error calculator 110 may receive a predicted value outputted through the predictor 140.

Then, the error value e is calculated (S120). For example, the error calculator 110 may output the error value e obtained by calculating a difference between the received utilization value and the predicted value.

The error calculator 110 may include the subtractor 112. That is, the error calculator 110 may output the difference between the utilization value and the predicted value as the error value e, as shown in Eq. 6, through the subtractor 112.

$$e = |\text{Utilization Value} - \text{Predicted Value}| \quad \text{Eq. 6}$$

Alternatively, the error calculator 110 may output the difference between the predicted value and the utilization value as the error value e, as shown in Eq. 1, through the subtractor 112.

The operation of the error calculator 110 is not limited thereto, and the difference between the predicted value and the utilization value may be calculated through various circuit configurations which can calculate the difference between the predicted value and the utilization value.

Then, a margin value is calculated (S130). For example, the margin value calculator 120 may receive the error value e outputted by the error calculator 110, and calculate the margin value m to be used for the calculation of the predicted value calculated by the predictor 140.

The margin value m may not have a fixed value. That is, based on the error value e corresponding to the difference between the predicted value and the utilization value, the value may be continuously changed.

The margin value m according to one or more example embodiments may be calculated as shown in Eq. 7 by using a Mean Absolute Percentage Error (MAPE) value for the remaining error values except the maximum error value, but example embodiments are not limited thereto.

$$m = \left\{ \left( \sum_{k=1}^{n} ek \right) - \max(e1, e2, \ldots, e(n-1)) \right\} / (n-1) \quad \text{Eq. 7}$$

For example, according to one or more example embodiments Root Mean Squared Error (RMSE), Mean Squared Error (MSE), Mean Error (ME), Mean Percentage Error (MPE), Mean Absolute Error (MAE), Mean Absolute Deviation (MAD), or Mean Absolute Scaled Error (MASE) may be used to calculate the margin value m.

Then, an anchor value is calculated (S140). In one or more example embodiments, the predicted value may be calculated based on the anchor value A. In one or more example embodiments, the anchor value A may be calculated via the anchor value calculator 130. The anchor value calculator 130 may receive the actual utilization value measured based on the resource usage, and calculate the anchor value A.

Then, the prediction constant is calculated and the predicted value is calculated (S150 and S160).

For example, the predictor 140 may receive the anchor value A from the anchor value calculator 130 and receive the margin value m from the margin value calculator 120, and calculate the predicted value based on the anchor value A and the margin value m.

More specifically, the predictor 140 may calculate the prediction constant p as shown in Eq. 3 by adding the margin value m and the anchor value A, or as shown in Eq. 4 by adding the margin value m multiplied by a weight w to the anchor value A. The anchor value A is to limit the range of the predicted value when the margin value m is excessively large or excessively small, and may be used to reduce the penalty for prediction failure. For example, the scheduler may be a CPU/Task load calculated by PELT in a scheduler according to one or more example embodiments, or a value proportional to utilization in DVFS according to one or more example embodiments.

The predictor 140 may calculate the predicted value by multiplying the calculated prediction constant p by the maximum value of the utilization value, as shown in Eq. 5 described above.

For example, when the prediction information generating system according to one or more example embodiments is applied to frequency selection, the prediction frequency may be Fmax*prediction constant p. As another example, when the prediction information generation system according to one or more example embodiments is applied to core selection, the core may be selected based on the value of CPUcapacity*prediction constant p.

The predictor 140 may transmit the calculated predicted value to the error calculator 110, more specifically, the subtractor 112.

As described above, the prediction information generating system according to one or more example embodiments may increase prediction accuracy by reflecting a difference between the actual utilization value and the predicted value. In addition, it is possible to reduce unnecessary power consumption due to a situation of using resources unnecessarily.

Figure 5:
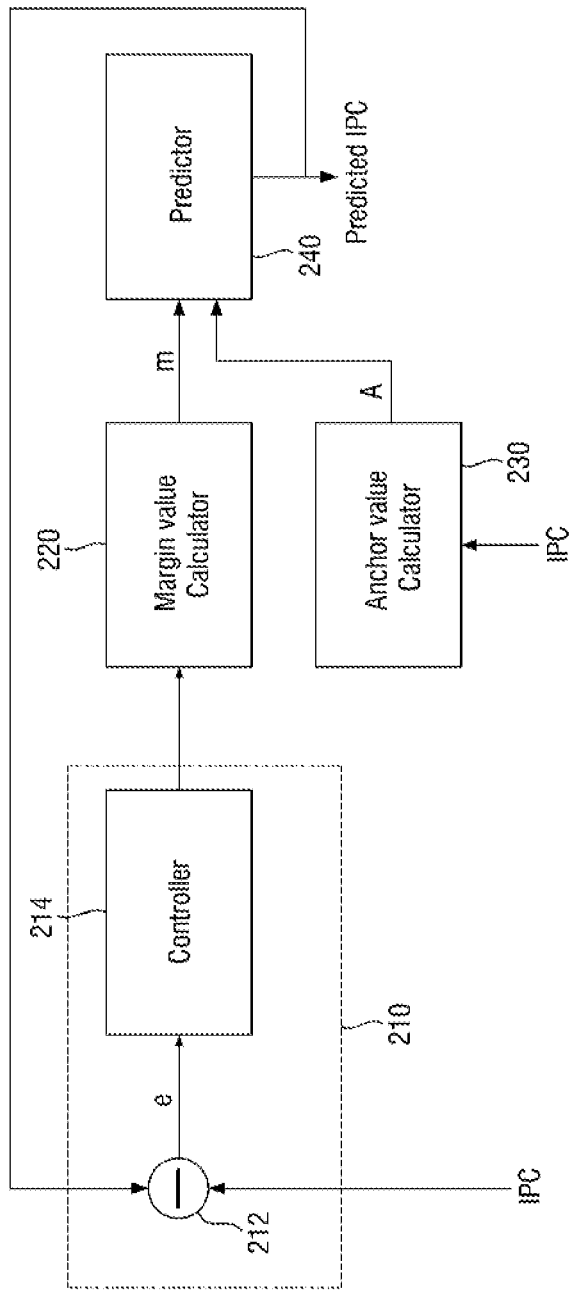
FIG. 5 is a block diagram illustrating another prediction information generating system according to one or more example embodiments.

FIG. 5 is a block diagram illustrating another prediction information generating system according to one or more example embodiments. For reference, because configurations and operations of FIG. 5 are similar to those of FIG. 2, except that a prediction value is obtained through Inter Process Communication (IPC) instead of a utilization value, differences from FIG. 2 will be mainly described.

Referring to FIG. 5, a prediction information generating system according to one or more example embodiments may be applied to interprocess communication, and may include an error calculator 210, a margin value calculator 220, an anchor value calculator 230 and a predictor 240. The error calculator 210 may include a subtractor 212 and a controller 214.

More specifically, in order to obtain an accurate predicted value in a mobile device, when the prediction time is long, the entire system operating time may be reduced. However, if the prediction time is reduced, the accuracy of the predicted value may be lowered, and the reliability of the mobile device may be reduced. Through the prediction information generating system according to one or more example embodiments, predictive modeling may be performed by reflecting the predicted value, thereby outputting an accurate predicted value for a short time. In addition, by reflecting a prediction failure obtained by calculating the error value e between the predicted value and the actual utilization value in the calculation of the predicted value, the accuracy of the predicted value can be further increased through a compensation measure.

The prediction information generating system according to one or more example embodiments is not limited to an interprocess communication environment, and may be applied to other environments that require performance and/or power consumption predictive modeling for a limited time and limited resource operation.

Figure 6:
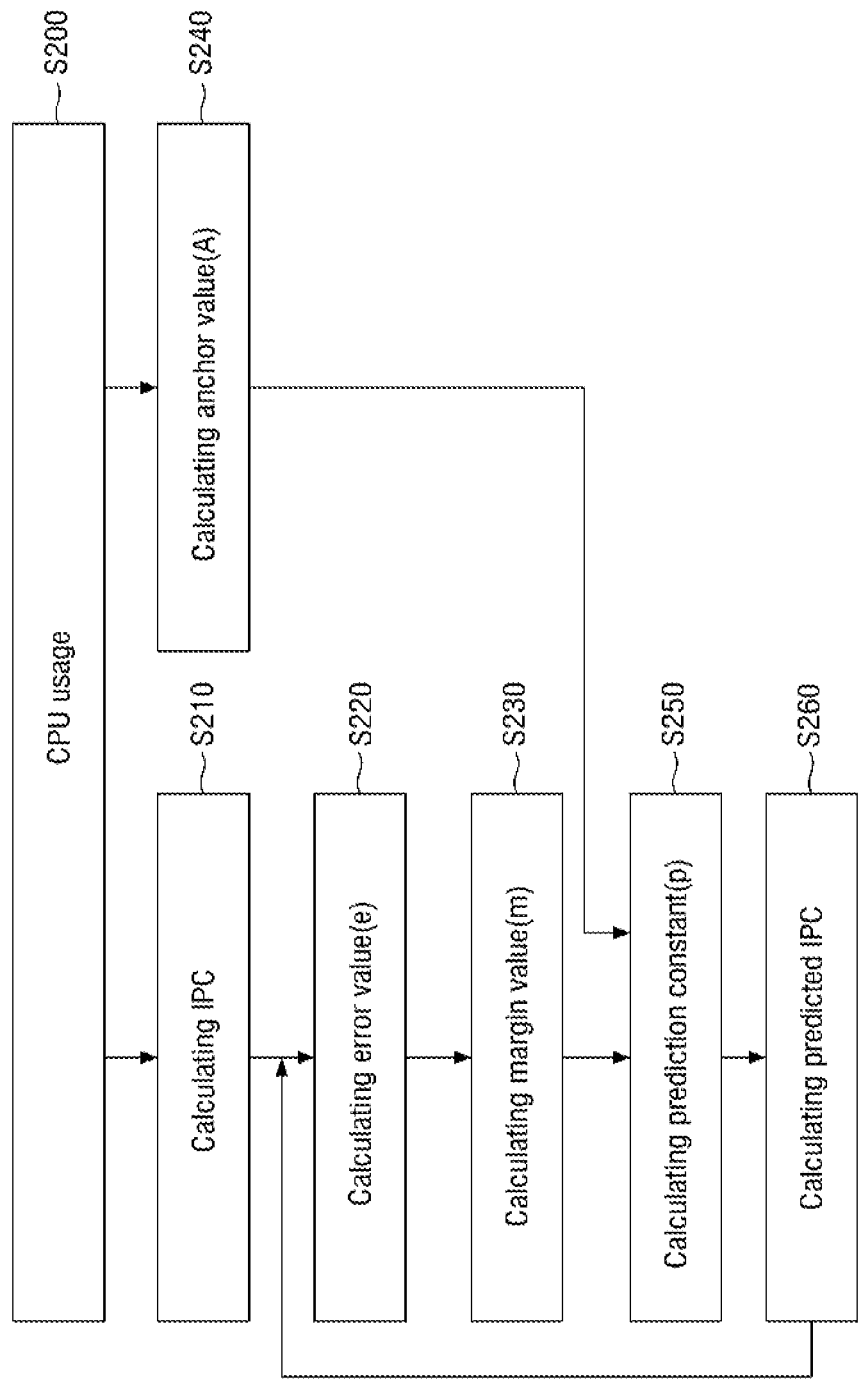
FIG. 6 is a block diagram illustrating a method of generating prediction information according to one or more example embodiments.

FIG. 6 is a block diagram illustrating a method of generating prediction information according to one or more example embodiments. For example, the method of generating prediction information illustrated in FIG. 6 may be performed by the prediction information generating system illustrated in FIG. 5. Because FIG. 6 is similar to FIG. 4, except that predictive modeling is performed based on the CPU usage rather than the resource usage, and the actual IPC usage is calculated based on the CPU usage, a repeated description will be omitted and differences will be briefly described.

Referring to FIGS. 5 and 6, the CPU usage information can be obtained (S200). Thereafter, the actual usage IPC is calculated through the CPU usage (S210), a difference value between the IPC predicted from the predictor 240 and the actual IPC is calculated through the error calculator 210, and the error value e is outputted (S220). The margin value calculator 220 calculates and outputs the margin value m based on the error value e (S230). The anchor value calculator 230 may output the anchor value A (S240). The predictor 240 may receive the anchor value A and the margin value m to generate the prediction constant p (S250), and output the predicted IPC value using the prediction constant p (S260).

The method of generating prediction information according to one or more example embodiments is not limited to an interprocess communication environment, and may be applied to other environments that require performance and/or power consumption predictive modeling for a limited time and limited resource operation.

Figure 7:
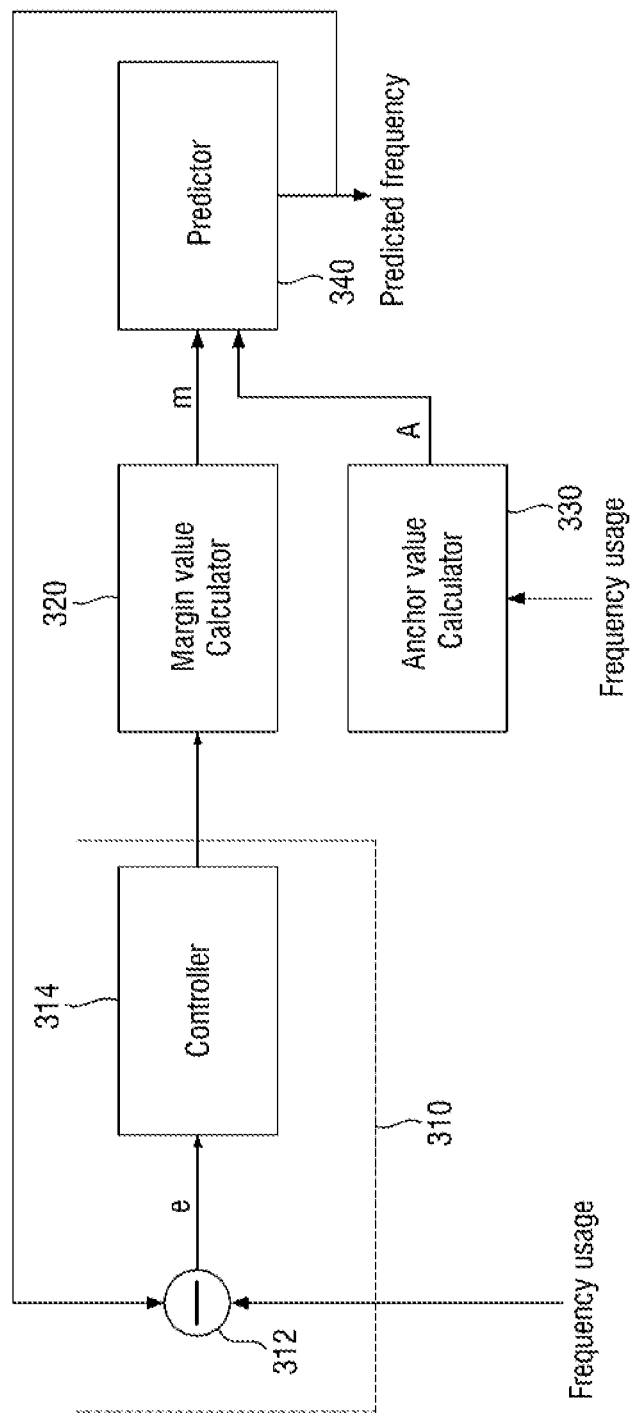
FIG. 7 is a block diagram illustrating still another prediction information generating system according to one or more example embodiments.

FIG. 7 is a block diagram illustrating still another prediction information generating system according to one or more example embodiments. For reference, because configurations and operations of FIG. 7 are similar to those of FIG. 2, except that a predicted value is obtained through frequency usage instead of a utilization value, differences from FIG. 2 will be mainly described. The frequency usage may indicate actual frequency usage from a certain time point in the past to a current time point at which the prediction is started.

Referring to FIG. 7, the prediction information generating system according to one or more example embodiments may be applied to dynamic voltage and frequency scaling (DVFS), and includes an error calculator 310, a margin value calculator 320, an anchor value calculator 330, and a predictor 340. The error calculator 310 may include a subtractor 312 and a controller 314.

The prediction information generating system according to one or more example embodiments is not limited to a DVFS environment, and may be applied to other environments that require performance and/or power consumption predictive modeling for a limited time and limited resource operation.

Figure 8:
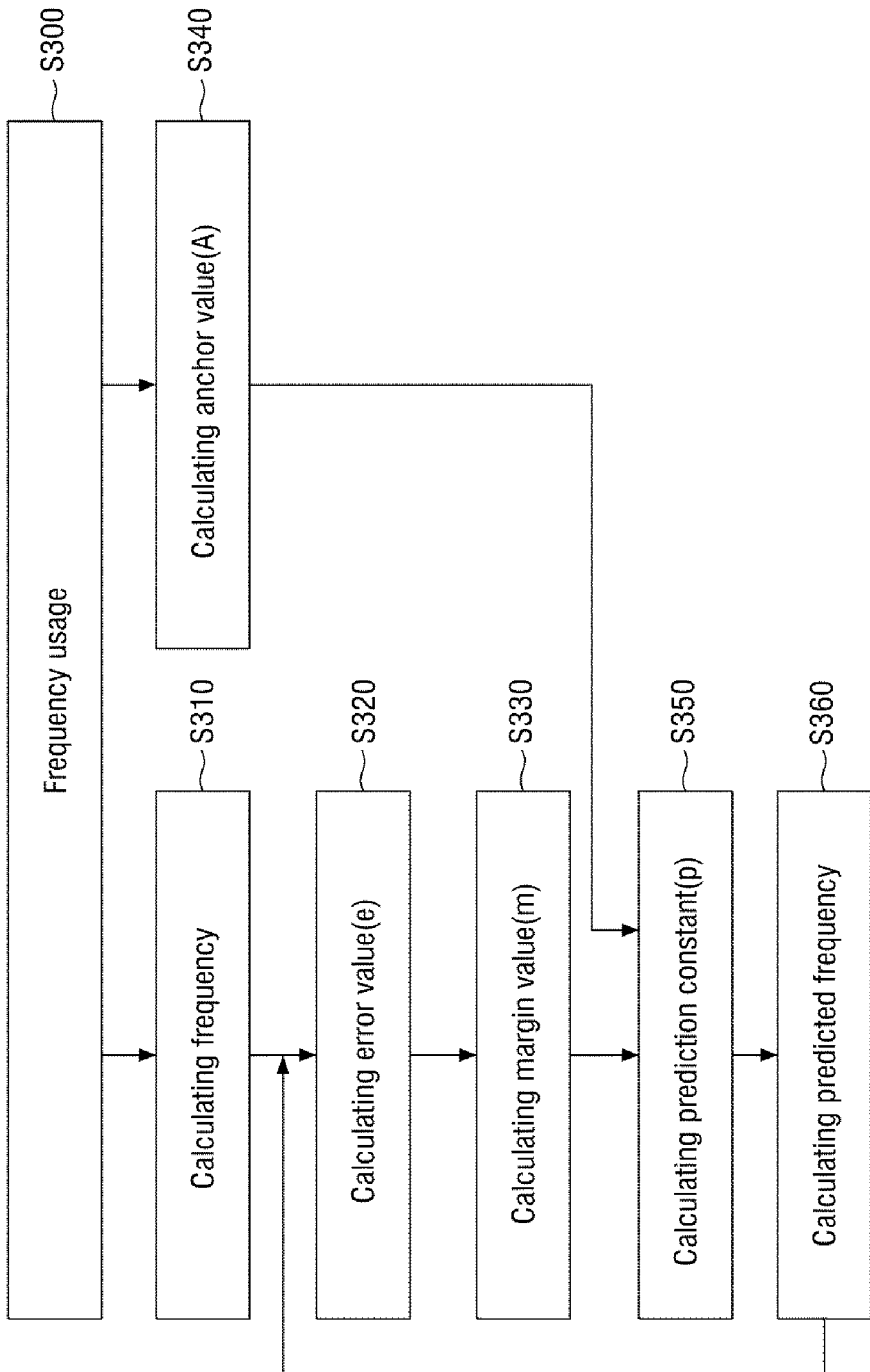
FIG. 8 is a block diagram illustrating a method of generating prediction information according to one or more example embodiments.

FIG. 8 is a block diagram illustrating a method of generating prediction information according to one or more example embodiments. For example, the method of generating prediction information illustrated in FIG. 8 may be performed by the prediction information generating system illustrated in FIG. 7. Because FIG. 8 is similar to FIG. 4, except that predictive modeling is performed based on the frequency usage rather than the resource usage, and the actual frequency usage is calculated based on the frequency usage, a repeated description will be omitted and differences will be briefly described.

Referring to FIGS. 7 and 8, the frequency usage information may be obtained (S300). Then, the actually used frequency is calculated based on the frequency usage (S310), and the error calculator 310 calculates a difference between the predicted frequency and the actual frequency from the predictor 340 and outputs the error value e (S320). The margin value calculator 320 calculates and outputs the margin value m based on the error value e (S330). The anchor value calculator 330 may output the anchor value A (S340). The predictor 340 may receive the anchor value A and the margin value m to generate the prediction constant p (S350), and output the predicted frequency using the prediction constant p (S360).

The method of generating prediction information according to one or more example embodiments is not limited to a DVFS environment, and may be applied to other environments that require performance and/or power consumption predictive modeling for a limited time and limited resource operation.

Figure 9:
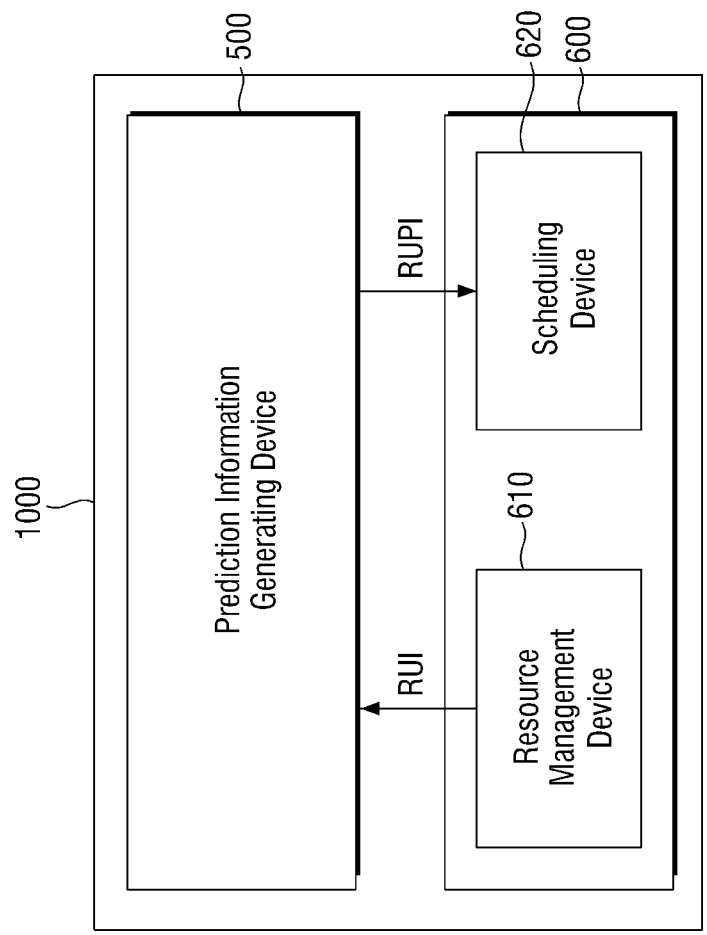
FIG. 9 is a block diagram of a semiconductor device according to one or more example embodiments.

FIG. 9 is a block diagram of a semiconductor device according to one or more example embodiments.

Referring to FIG. 9, a semiconductor device 1000 may include a prediction information generating device 500 and a processing device 600.

In one or more example embodiments, the semiconductor device 1000 may include an application processor (AP), but example embodiments are not limited thereto. The semiconductor device 1000 may include a processor other than an application processor, or a data processing device other than the processor.

The processing device 600 may consume resources while performing certain processing.

The prediction information generating device 500 may be provided with resource usage information (RUI) from the processing device 600. Here, the resource usage information (RUI) may include information indicating the amount of use of a particular resource through the processing device 600 at a certain time point. For example, the resource usage information (RUI) may include power usage consumed by the processing device 600 or a particular module of the processing device 600 at a certain time point.

The resource usage information (RUI) may be provided to the prediction information generating device 500 by, for example, a resource management device 610 of the processing device 600.

The prediction information generating device 500 may employ the configuration of the prediction information generating system according to various example embodiments described above. The prediction information generating device 500 may receive the above-described utilization value from the resource usage information (RUI), and after generating a predicted value through the operation, it may be provided to the processing device 600 in the form of, for example, resource usage prediction information (RUPI).

The processing device 600 may perform an operation using the provided resource usage prediction information (RUPI). For example, a scheduling device 620 of the processing device 600 may receive the resource usage prediction information (RUPI), and schedule a task to be performed by the processing device 600, or control the components included in the processing device 600, so that an operation of the processing device 600 can be performed.

In one or more example embodiments, the resource management device 610 may include a power management unit (PMU) which provides power consumption of a central processing unit (CPU) of the processing device 600 as resource usage information (RUI). The scheduling device 620 may schedule an operating frequency of the central processing unit of the processing device 600 or schedule power to be provided to the central processing unit based on the resource usage prediction information (RUPI). In addition, the scheduling device 620 may select some cores from among a plurality of cores included in the processing device 600 based on the resource usage prediction information (RUPI).

At least one of the controllers, calculators, predictors, devices, generators, or other elements represented by a block as illustrated in FIGS. 1-3, 5, 7 and 9 may be embodied as various numbers of hardware, software and/or firmware structures that execute respective functions described above, according to one or more example embodiments. For example, at least one of these controllers, calculators, predictors, devices, generators, or other elements may use a direct circuit structure, such as a memory, a processor, a logic circuit, a look-up table, etc. that may execute the respective functions through controls of one or more microprocessors or other control apparatuses. Also, at least one of these controllers, calculators, predictors, devices, generators, or other elements may be specifically embodied by a module, a program, or a part of code, which contains one or more executable instructions for performing specified logic functions, and executed by one or more microprocessors or other control apparatuses. Also, at least one of these controllers, calculators, predictors, devices, generators, or other elements may further include or may be implemented by a processor such as a central processing unit (CPU) that performs the respective functions, a microprocessor, or the like. Two or more of controllers, calculators, predictors, devices, generators, or other elements may be combined into one single component, element, module or unit which performs all operations or functions of the combined two or more controllers, calculators, predictors, devices, generators, or other elements. Also, at least part of functions of at least one of these controllers, calculators, predictors, devices, generators, or other elements may be performed by another of these controllers, calculators, predictors, devices, generators, or other elements. Further, although a bus is not illustrated in the above block diagrams, communication between the controllers, calculators, predictors, devices, generators, or other elements may be performed through the bus. Functional aspects of the above example embodiments may be implemented in algorithms that execute on one or more processors. Furthermore, the components, elements, modules or units represented by a block or processing steps may employ any number of related art techniques for electronics configuration, signal processing and/or control, data processing and the like.

While example embodiments have been shown and described above, it will be apparent to those skilled in the art that many variations and modifications can be made to the described example embodiments without substantially departing from the principles of the present disclosure as defined by the appended claims.

What is claimed is:

1. A semiconductor device comprising:
  a processor configured to implement a processing device configured to provide resource usage information comprising a utilization value; and
  prediction information generating circuitry configured to generate resource usage prediction information based on the resource usage information and provide the resource usage prediction information to the processing device,
  wherein the prediction information generating circuitry comprises:
    error calculation circuitry configured to calculate an error value between the utilization value and a predicted value included in the resource usage prediction information;
    margin value calculation circuitry configured to receive the error value from the error calculation circuitry and calculate a margin value that changes over time using the error value;
    anchor value calculation circuitry configured to calculate an anchor value using the utilization value; and
    prediction circuitry configured to output the predicted value by calculating a prediction constant using the anchor value and the margin value, and wherein the processing device is further configured to control resource allocation of the processing device based on the resource usage prediction information.

2. The semiconductor device of claim 1, wherein the error calculation circuitry is further configured to identify the error value as a difference between the utilization value and the predicted value.

3. The semiconductor device of claim 2, wherein the error calculation circuitry is further configured to calculate a plurality of error values between the utilization value and the predicted value, the error value being one of the plurality of error values, and sequentially output the plurality of error values in a first in first out (FIFO) manner.

4. The semiconductor device of claim 1, wherein the error calculation circuitry is further configured to identify a plurality of error values between the utilization value and the predicted value, the error value being one of the plurality of error values, and wherein the margin value calculation circuitry is further configured to calculate the margin value using a Mean Absolute Percentage Error (MAPE) function and the plurality of error values.

5. The semiconductor device of claim 1, wherein the anchor value calculation circuitry is further configured to calculate the anchor value based on a central processing unit (CPU) load.

6. The semiconductor device of claim 1, wherein the prediction circuitry is further configured to identify the prediction constant by adding the anchor value and the margin value.

7. The semiconductor device of claim 1, wherein the prediction circuitry is further configured to identify the prediction constant by multiplying the margin value by a weight, and adding the anchor value and the weighted margin value.

8. The semiconductor device of claim 1, wherein the margin value calculation circuitry is further configured to change the margin value over time based on a difference between the utilization value and the predicted value.

9. A prediction method for resource usage in a semiconductor device, the prediction method comprising:

receiving, by an error calculator, a utilization value and a predicted value, and calculating an error value between the utilization value and the predicted value;

receiving, by a margin value calculator, the error value from the error calculator, and calculating a margin value that changes over time using the error value;

calculating, by an anchor value calculator, an anchor value using the utilization value;

calculating, by a predictor, a prediction constant using the anchor value and the margin value and outputting the predicted value; and controlling, by a scheduler, resource allocation of the semiconductor device based on the predicted value.

10. The prediction method of claim 9, wherein the calculating the error value between the utilization value and the predicted value is performed by a subtractor of the error calculator.

11. The prediction method of claim 10, wherein the calculating the error value comprises calculating a plurality of error values between the utilization value and the predicted value, and the error value is one of the plurality of error values, and wherein the prediction method further comprises sequentially outputting the plurality of error values in a first in first out (FIFO) manner.

12. The prediction method of claim 9, wherein the calculating the error value comprises calculating a plurality of error values between the utilization value and the predicted value, and the error value is one of the plurality of error values, and wherein the calculating the margin value uses a Mean Absolute Percentage Error (MAPE) function and the plurality of error values.

13. The prediction method of claim 9, wherein the calculating the anchor value comprises using a central processing unit (CPU) load.

14. The prediction method of claim 9, wherein the calculating the prediction constant comprises adding the anchor value and the margin value.

15. The prediction method of claim 9, wherein the calculating the prediction constant comprises multiplying the margin value by a weight, and adding the anchor value and the weighted margin value.

16. A semiconductor device comprising:

a processor configured to implement a processing device configured to provide resource usage information comprising a utilization value; and prediction information generating circuitry configured to generate resource usage prediction information based on the resource usage information and provide the resource usage prediction information to the processing device, wherein the prediction information generating circuitry comprises:

error calculation circuitry configured to calculate an error value using the utilization value and a predicted value included in the resource usage prediction information;

margin value calculation circuitry connected to the error calculation circuitry that is configured to calculate a margin value that varies over time;

anchor value calculation circuitry configured to receive the utilization value; and prediction circuitry connected to the margin value calculation circuitry and the anchor value calculation circuitry, and configured to output the predicted value, wherein the predicted value varies according to a difference between the utilization value and the predicted value, and wherein the processing device is further configured to control resource allocation of the processing device based on the resource usage prediction information.

17. The semiconductor device of claim 16, wherein the error calculation circuitry is further configured to identify the difference between the utilization value and the predicted value.

18. The semiconductor device of claim 16, wherein the error calculation circuitry is further configured to calculate a plurality of error values between the utilization value and the predicted value, the error value being one of the plurality of error values, and sequentially output the plurality of error values in a first in first out (FIFO) manner.

19. The semiconductor device of claim 16, wherein the error calculation circuitry is further configured to identify a plurality of error values between the utilization value and the predicted value, the error value being one of the plurality of error values, wherein the margin value calculation circuitry is further configured to calculate the margin value using a Mean Absolute Percentage Error (MAPE) function and the plurality of error values, and
wherein the prediction circuitry is further configured to identify the predicted value using the margin value.

20. The semiconductor device of claim 19, wherein the anchor value calculation circuitry is further configured to calculate an anchor value using the utilization value,
wherein the prediction circuitry is further configured to identify the predicted value by adding the anchor value and the margin value.

* * * * *